United States Patent
Ohashi et al.

(10) Patent No.: US 12,456,227 B2
(45) Date of Patent: Oct. 28, 2025

(54) SELECTIVE COLOR REPLACEMENT USING IMAGE RECOGNITION

(71) Applicant: INTERNATIONAL BUSINESS MACHINES CORPORATION, Armonk, NY (US)

(72) Inventors: Kaoru Ohashi, Tokyo (JP); Akira Fujiu, Mitaka (JP); Kazuki Sekiguchi, Adachi (JP); Taihei Miyamoto, Nakano (JP)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 17/695,983

(22) Filed: Mar. 16, 2022

(65) Prior Publication Data

US 2023/0298211 A1    Sep. 21, 2023

(51) Int. Cl.
*G06T 7/90* (2017.01)

(52) U.S. Cl.
CPC ...... *G06T 7/90* (2017.01); *G06T 2207/20081* (2013.01)

(58) Field of Classification Search
CPC . G06T 2207/20084; G06T 2207/20081; G06T 7/90
See application file for complete search history.

(56) References Cited

U.S. PATENT DOCUMENTS

| | | | |
|---|---|---|---|
| 9,418,585 B2 | 8/2016 | Chandel | |
| 9,799,254 B2 | 10/2017 | Park | |
| 9,826,898 B1 | 11/2017 | Jin | |
| 2018/0197313 A1* | 7/2018 | Chakravorty | ......... G06T 11/001 |
| 2021/0004589 A1* | 1/2021 | Turkelson | ........ G06V 30/19173 |
| 2021/0319219 A1* | 10/2021 | Kale | ..................... G06T 7/0012 |

FOREIGN PATENT DOCUMENTS

JP    2019125912 A    7/2019

OTHER PUBLICATIONS

"Chromatic Glass", Copyright © 2013 by Kazunori Asada, 2 pps., <https://asada.website/chromaticglass/e/index.html>.
Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — John R Wallace
(74) *Attorney, Agent, or Firm* — Daniel M. Yeates

(57) ABSTRACT

Disclosed are techniques for selective color replacement using image recognition, including a method for generating an image with improved accessibility for color vision diversity. The method may comprise, in an operation phase obtaining, as an output, a first set of objects included in a first image by inputting the first image to a first AI model, obtaining, as an output, a second set of objects included in a second image by inputting the image to a second AI model, comparing the first set of objects and the second set of objects to extract an object that is included in the first set of objects but not included in the second set of objects as an unrecognized object, and replacing a color of the unrecognized object in the first image with a color easily recognized by a person having color vision deficiency.

20 Claims, 7 Drawing Sheets

SELECTIVE COLOR REPLACEMENT USING IMAGE RECOGNITION

BACKGROUND

The present disclosure relates to accessibility techniques, and more specifically, to using image recognition to enable selective color replacement.

About one in every twenty men and about one in every five hundred women have some form of color vision deficiency. It may be difficult for such individuals to recognize color-coding used in product user interfaces (e.g., graphical user interfaces), presentation slides, etc. Many universal access rules and laws, therefore, include a mandate to minimize color barriers, e.g., so that information may be conveyed to everyone equally.

It is possible to simulate how an image would be seen by persons having color vision deficiency, and to propose colors that are easily distinguished by persons having color vision deficiency. However, it remains unknown how color vision deficient persons can actually recognize an arbitrary object in an arbitrary image.

SUMMARY

According to embodiments of the present disclosure, a method for generating an image with improved accessibility for color vision diversity, the method comprising, in an operation phase obtaining, as an output, a first set of objects included in a first image by inputting the first image to a first AI model, obtaining, as an output, a second set of objects included in a second image by inputting the image to a second AI model, comparing the first set of objects and the second set of objects to extract an object that is included in the first set of objects but not included in the second set of objects as an unrecognized object, and replacing a color of the unrecognized object in the first image with a color easily recognized by a person having color vision deficiency. The method may further comprise generating, by a third AI model, from the first image targeted to improve accessibility, the second image having colors as viewed by the person having color vision deficiency. In some embodiments, a plurality of the second AI models are prepared, wherein each second AI model of the plurality of the second AI models corresponding to a different color vision characteristic. The method may further comprise, in an AI model learning phase, generating, from a first learning data set of normal images, a second learning data set of images with colors looked at by a person having color vision deficiency, and training a first AI model by the first learning data set to recognize images and training a second AI model by the second learning data set to recognize images. In some embodiments, the first learning data set of normal images comprises domain-specific images. The method may further comprise selectively replacing the first image with the second image in a computer graphics display. In some embodiments, the replacing improves a recognition metric in the graphical user interface by people with a color vision deficiency. In some embodiments, the computer graphics display comprises a graphical user interface. In some embodiments, the computer graphics display comprises a presentation slide.

According to embodiments of the present disclosure, a computer program product for generating an image with improved accessibility for color vision diversity. The computer program product may comprise a computer readable storage medium having program instructions embodied therewith. The program instructions may be executable by a computer to perform a method comprising, in an operation phase, obtaining, as an output, a first set of objects included in a first image by inputting the first image to a first AI model, obtaining, as an output, a second set of objects included in a second image by inputting the image to a second AI model, comparing the first set of objects and the second set of objects to extract an object that is included in the first set of objects but not included in the second set of objects as an unrecognized object, and replacing a color of the unrecognized object in the first image with a color easily recognized by a person having color vision deficiency.

According to embodiments of the present disclosure, a system for generating an image with improved accessibility for color vision diversity. The system may comprise one or more processors, and a memory communicatively coupled to the one or more processors. The memory may comprises instructions which, when executed by the one or more processors, cause the one or more processors to perform a method comprising obtaining, as an output, a first set of objects included in a first image by inputting the first image to a first AI model, obtaining, as an output, a second set of objects included in a second image by inputting the image to a second AI model, comparing the first set of objects and the second set of objects to extract an object that is included in the first set of objects but not included in the second set of objects as an unrecognized object, and replacing a color of the unrecognized object in the first image with a color easily recognized by a person having color vision deficiency.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
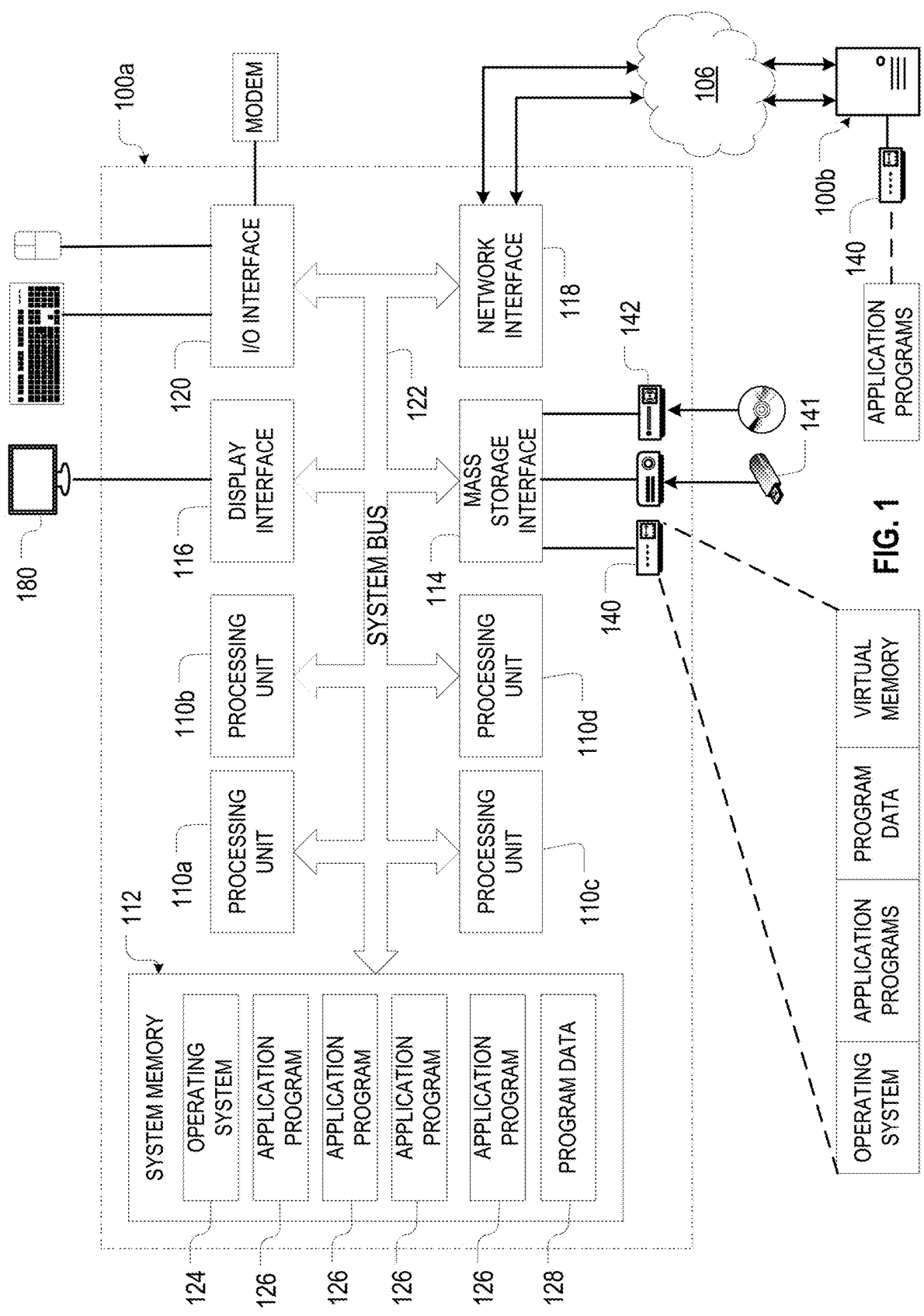
FIG. 1 illustrates a data processing system, consistent with some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to accessibility techniques; more particular aspects relate to using image recognition to enable selective color replacement. While the present disclosure is not necessarily limited to such applications, various aspects of the disclosure may be appreciated through a discussion of various examples using this context.

Some embodiments of this disclosure may use an artificial intelligence (AI) image recognition model (AI model) to simulate how a color vision deficient person recognizes a particular object in a particular image. Some embodiments may use the output of the AI model to assist color deficient users in recognizing otherwise-unrecognizable object(s) by changing its/their color(s), thus making it possible to create images with reduced color barriers. That is, some embodiments may identify specific object(s) in an image whose color should be changed to improve object recognition. Additionally, some embodiments may include a method to determine object(s) for which color correction corresponding to color vision deficiency should not be performed, other than to add photo image data tags thereto.

In operation, colors of objects in an image may be changed in some embodiments, and the same color may be allocated to an object (i.e., recognized by the AI model as being the same) in sequential images (e.g., video) such that a unique color of the object can be maintained. Some embodiments may use this technique to remove color barriers in videos and in real-time displays (e.g., graphical user interfaces or "GUIs").

Some embodiments may assist color vision deficient users to recognize otherwise-unrecognizable object(s) by, in an initial training phase, preparing teacher data for an image recognition AI model, such as a neural network. Next, in the initial training phase, some embodiments may generate a new version of an image with a change of colors (i.e., to the colors as viewed by a color vision deficient person) based on an image in the teacher data, and then perform AI learning on the unmodified teacher data and the modified teacher data (i.e., with the color change). Next, in a subsequent operation phase, some embodiments may prepare an image from a source (e.g., from which a user wants to remove color barriers), then generate a candidate version for color vision deficiency based on the source image. Next, some embodiments may transfer the original and modified images to a corresponding AI model for object recognition. Then, some embodiments may set object(s) recognized in the same manner by the two respective AIs as an object whose color is not changed and/or need not be further changed. Some embodiments may then repeat the process to convert any other object(s) into colors that can be more easily identified by the color vision deficient person. Some embodiments may further utilize a recognition metric (e.g., user survey score or test) by which an amount of improvement may be measured.

Some embodiments may use one or more of these techniques to determine whether elements of a computer graphics display (e.g., elements in a graphical user interface (GUI) of product, presentation slides, kiosk display, etc.) can be easily recognized by color vision deficient people, and whether some or all of the elements in that computer graphics display can be reproduced with a change of colors. Some embodiments may then adapt the element(s) to a state with reduced color barriers. Some embodiments may also use these technique to automatically and dynamically change the colors of objects in computer graphics displays on a smartphone screen, television, etc. used by a color vision deficient person to make it easier for that color vision deficient person to recognize those objects. For example, some embodiments may analyze a broadcast television program, and then dynamically and selectively alter the colors of some objects in that broadcast television program display to improve accessibility by persons with color vision deficiencies.

One feature and advantage of some embodiments is that they may individually and/or selectively change the color of each of unrecognizable object in an image, video, display, etc. Conventional systems, in contrast, only change colors that are difficult for color vision deficient persons over the entire image, video, or screen. That is, different objects with the same original colors are changed to the same color, regardless of whether that particular object is difficult to recognize by color vision deficient people and regardless of whether the change of that particular object will help. Another feature and advantage of some embodiments is that they may not require categorizing objects in advance, and thus, may allow changing the color of each object according to recognition by an AI model trained to mimic a color vision deficient person. Conventional systems, in contrast, only determine an object subjected to color conversion from a predetermined category and only change identical colors uniformly.

Some embodiments may be desirable because they can detect more and more general objects whose colors are difficult to distinguish by color vision deficient persons, by comparing the recognizing results among the AI models without special training data sets, such as domain-specific image data. Some embodiments may be desirable because they can provide automated color change by use of trained AI models of both normal color vision and color vision deficiency. Additionally, some embodiments do not need user input for color adjusting, and can detect which general objects need color changes. Some embodiments can change an object's color based on object recognition of normal color vision and color deficient vision, and thus, can improve color deficient users' object recognition by changing colors in specific objects. Some embodiments may change an object's color based on object recognition of normal and color deficiency, thus, can improve color deficient users' object recognition by changing colors in specific objects.

Data Processing System (DPS)

FIG. 1 illustrates a data processing system (DPS) 100*a*, 100*b* (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and the number, type, and configuration of such components may vary.

The DPS 100 in FIG. 1 may comprise a plurality of processing units 110*a*-110*d* (generically, processor 110 or CPU 110) that may be connected to a main memory 112, a mass storage interface 114, a terminal/display interface 116, a network interface 118, and an input/output ("I/O") interface 120 by a system bus 122. The mass storage interface 114 in this embodiment may connect the system bus 122 to one or more mass storage devices, such as a direct access storage device 140, a USB drive 141, and/or a readable/writable optical disk drive 142. The network interface 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the DPS 100 may only comprise a single processor system and/or a single processor designed to emulate a multiprocessor system. Further, the processor(s) 110 may be implemented using a number of heterogeneous data processing systems in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard, mouse, modem, or printer (not shown)

The terminal/display interface 116 may be used to directly connect one or more displays 180 to the DPS 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the DPS 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
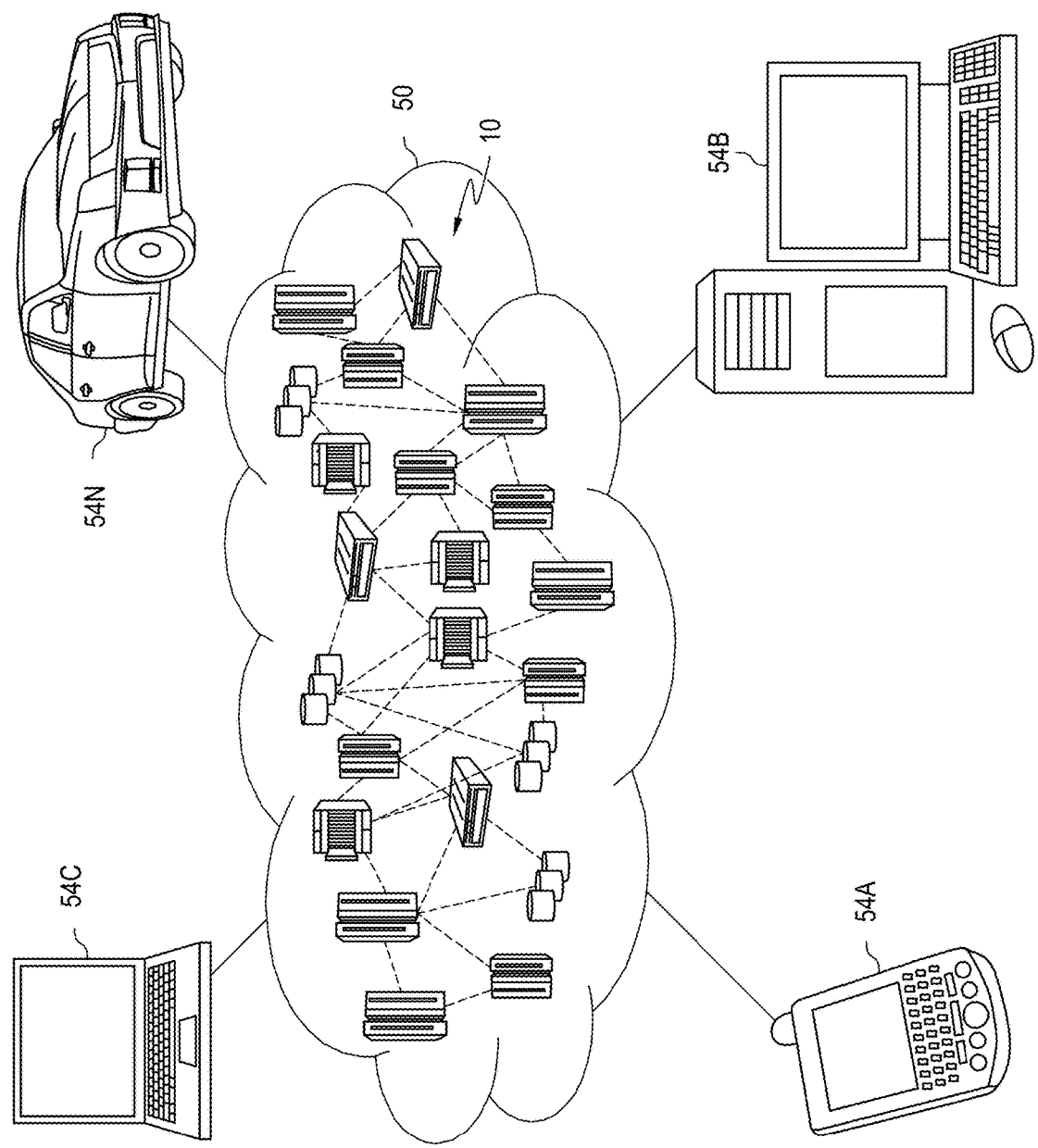
FIG. 2 illustrates a cloud environment suitable for enabling a selective color replacement service, consistent with some embodiments.

FIG. 2 illustrates a cloud environment suitable for enabling a selective color replacement service, consistent with some embodiments. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
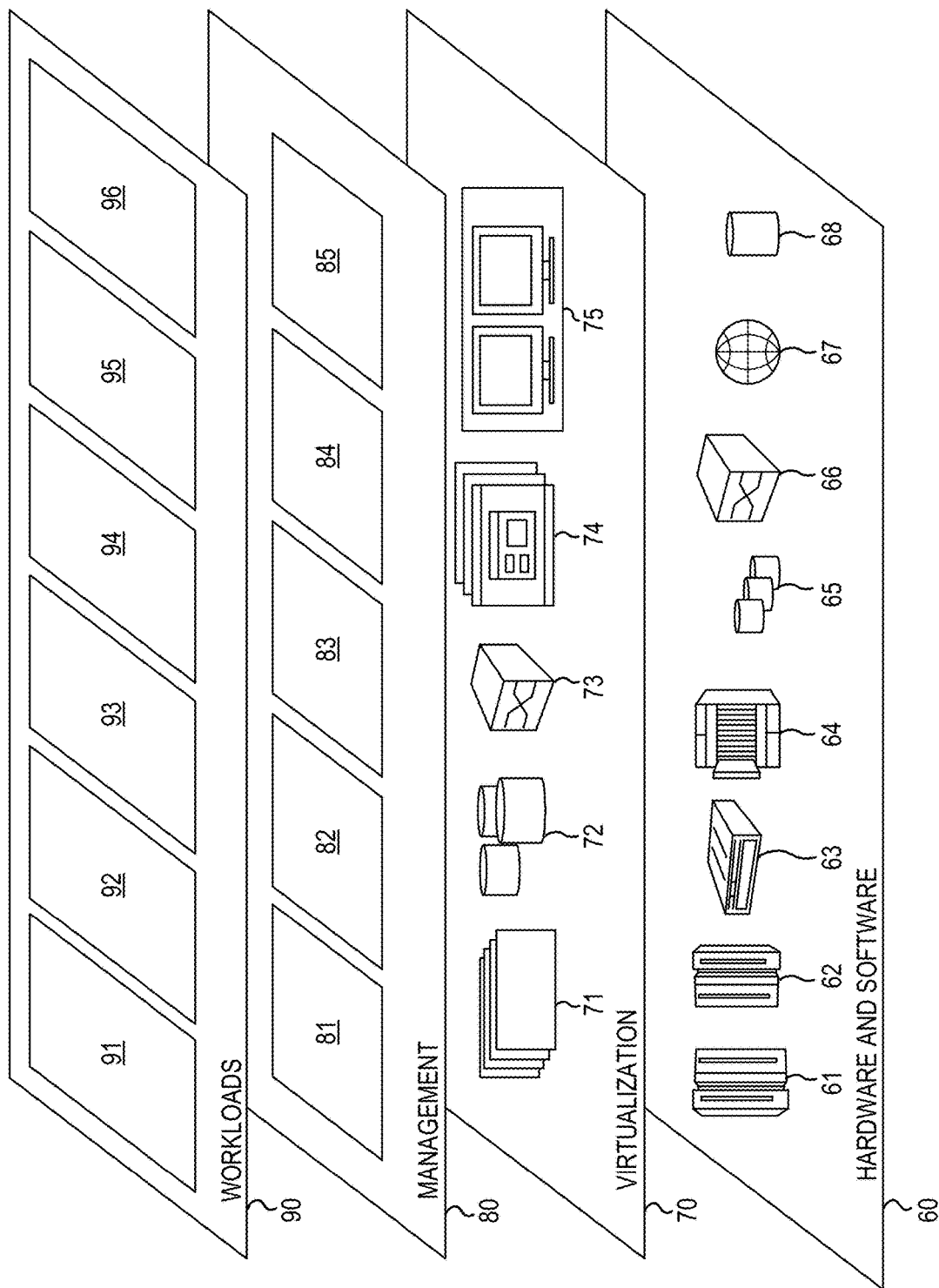
FIG. 3 shows a set of functional abstraction layers provided by the cloud computing environment of FIG. 2.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective color replacement service 96.

Machine Learning

The selective color replacement service in some embodiments may comprise one or more trained artificial intelligence models ("AI models"). These AI models may be any software system that recognizes patterns in data sets. In some embodiments, the AI models comprise a plurality of artificial neurons interconnected through connection points called synapses. Each synapse encodes a strength of the connection between the output of one neuron and the input of another. The output of each neuron, in turn, is determined by the aggregate input received from other neurons that are connected to it, and thus by the outputs of these "upstream" connected neurons and the strength of the connections as determined by the synaptic weights.

Figure 4A:
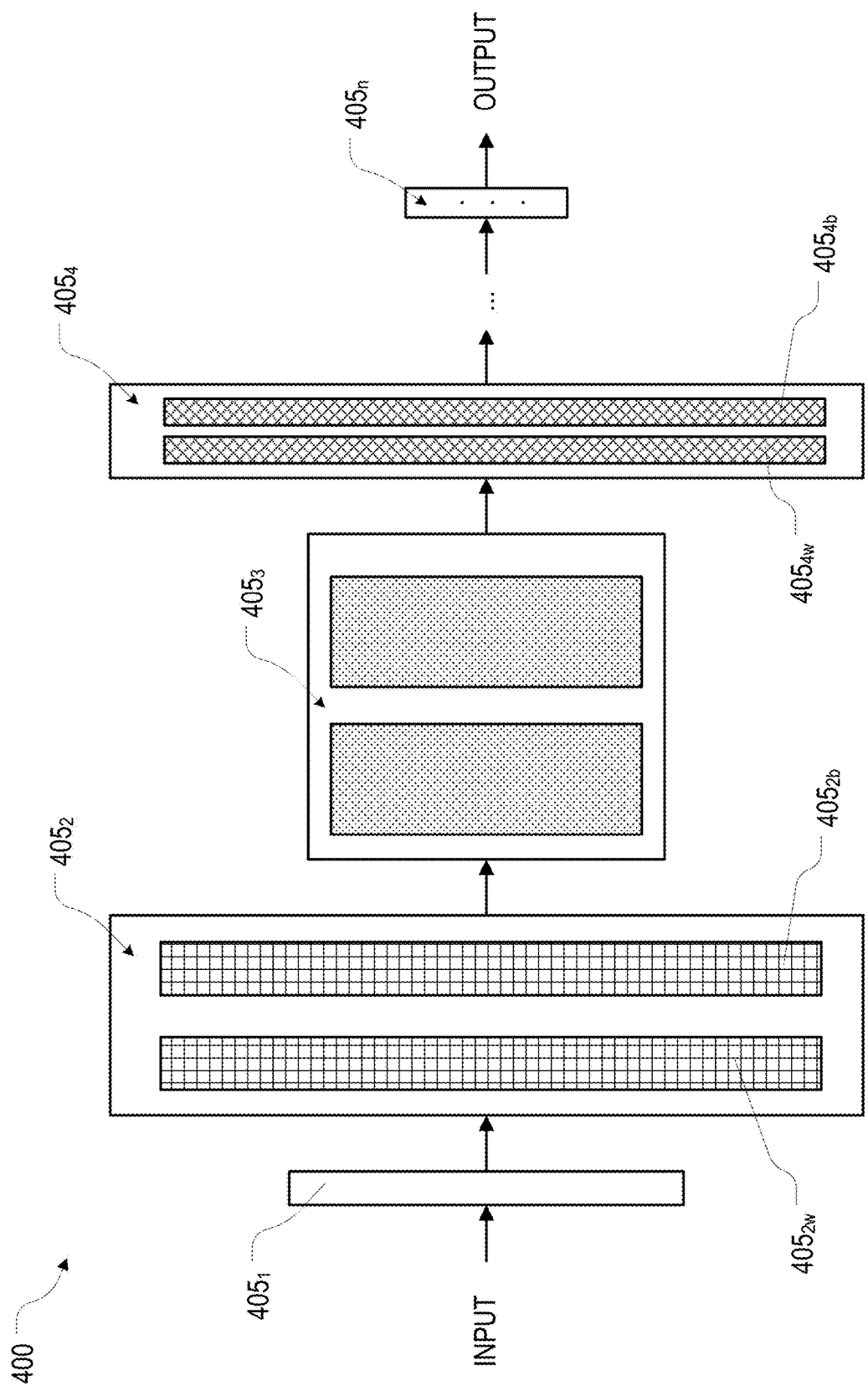
FIG. 4A illustrates an example AI model, consistent with some embodiments.

The AI models are trained to solve a specific problem (e.g., confidentiality assessment) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function. In some embodiments, the artificial neurons may be organized into layers. FIG. 4A illustrates an example AI model 400, consistent with some embodiments. The AI model 400 comprises a plurality of layers $405_1$-$405_n$. Each of the layers comprises weights $405_{1w}$-$405_{nw}$ and biases $405_{1b}$-$405_{nb}$ (only some labeled for clarity). The layer $405_1$ that receives external data is the input layer. The layer $405_n$ that produces the ultimate result is the output layer. Some embodiments include a plurality of hidden layers $405_2$-$405_{n-1}$ between the input and output layers, and commonly hundreds of such hidden layers. Some of the hidden layers $405_2$-$405_{n-1}$ may have different sizes, organizations, and purposes than others of the hidden layers $405_2$-$405_{n-1}$. For example, some of the hidden layers in the AI model may be convolution layers, while other hidden layers may be fully connected layers, deconvolution layers, or recurrent layers.

Figure 4B:
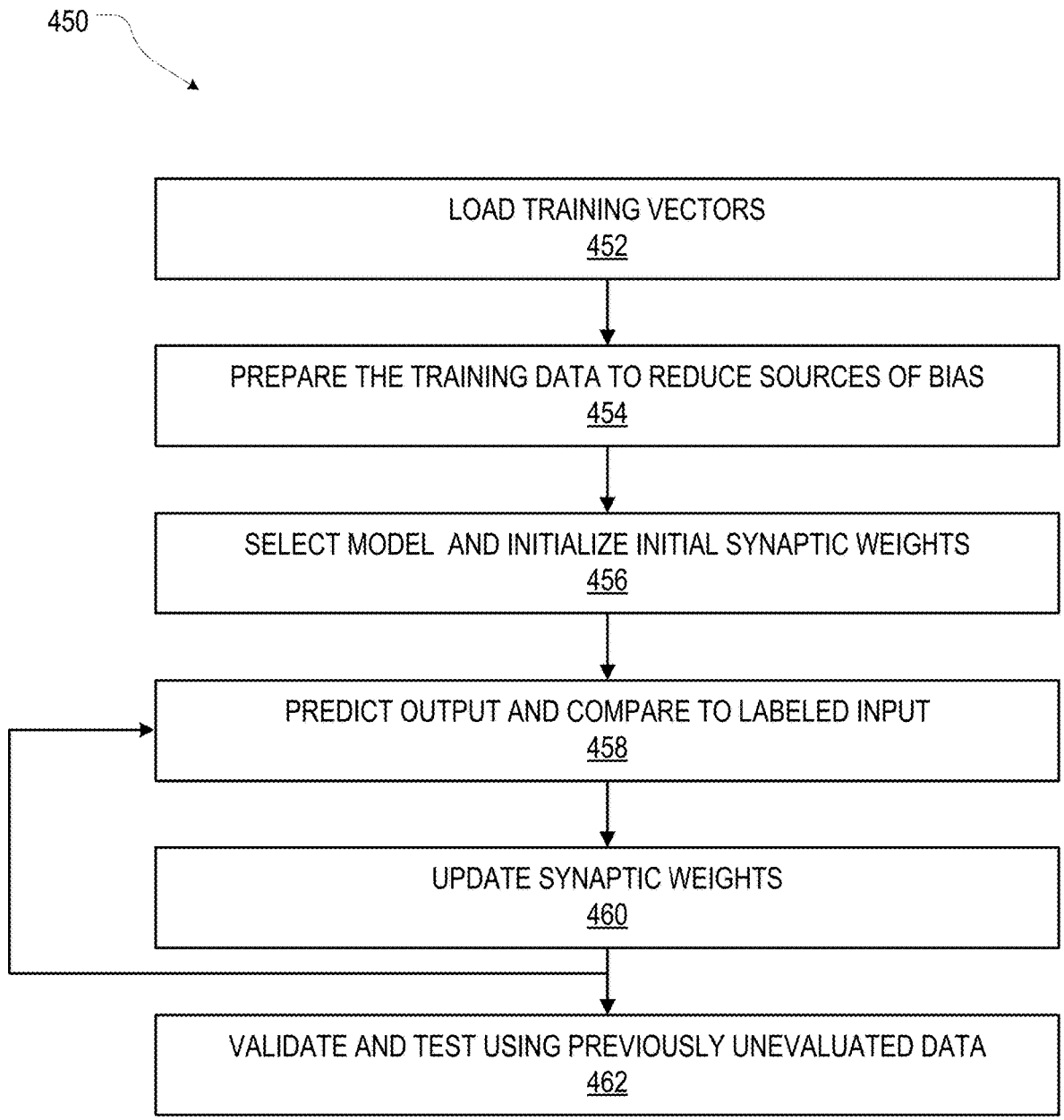
FIG. 4B depicts one embodiment of an AI model training method, consistent with some embodiments.

Referring now to FIG. 4B, one embodiment of an AI model training method 450 is depicted, described with reference to object identification as an illustrative example. At operation 452, the system receives and loads training data. In this example, the input data-set may include a plurality of images and associated, manually-generated tags for any objects therein. At operation 454, the training data is prepared to reduce sources of bias, typically including de-duplication, normalization, and order randomization. At operation 456, a model is selected for training and the initial synaptic weights are initialized (e.g., randomized). Depending on the underlying task, suitable models include, but are not limited to, feedforward techniques (e.g., convolutional neural networks), regulatory feedback-based systems, radial basis function (RBF) techniques, and recurrent neural network-based techniques (e.g., long short-term memory). At operation 458, the selected model is used to predict an output using the input data element, and that prediction is compared to the corresponding target data. A gradient (e.g., difference between the predicted value and the target value) is then used at operation 460 to update the synaptic weights. This process repeats, with each iteration updating the weights, until the training data is exhausted, or the model reaches an acceptable level of accuracy and/or precision. At operation 462, the resulting model may optionally be compared to previously unevaluated data to validate and test its performance.

Figure 5:
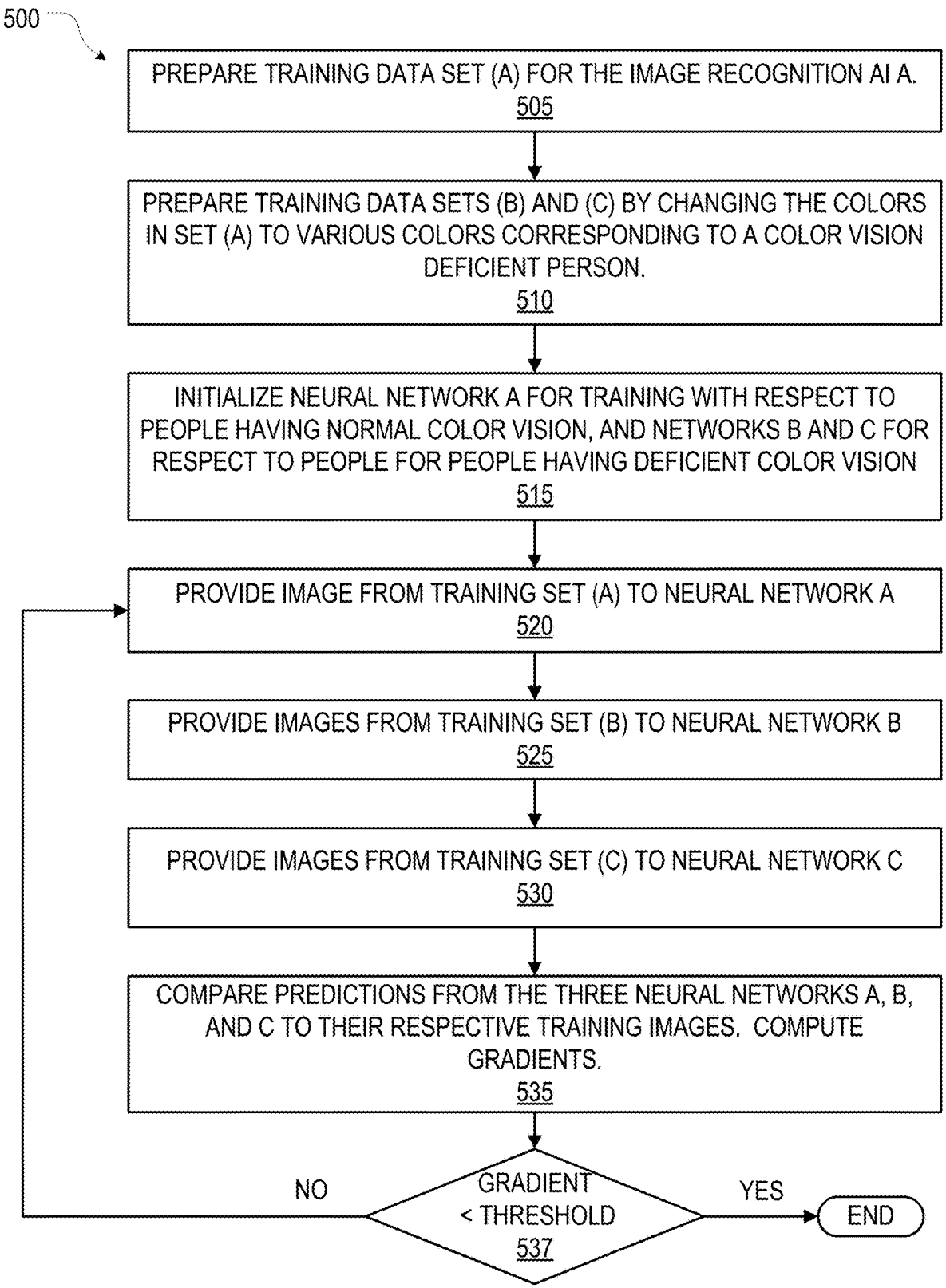
FIG. 5 is a flow chart illustrating one method for training a normal AI model and color vision deficient AI model during an initial training phase in more detail, consistent with some embodiments.

FIG. 5 is a flow chart illustrating one method 500 for training a normal AI model and color vision deficient AI model during an initial training phase in more detail, consistent with some embodiments. At operation 505, training data set (a) may be prepared for the image recognition AI. Training data set (a) may be any set of data used for training image recognition AI. Additionally or alternatively, a user can prepare a training data set to use as set (a), such as domain-specific data e.g., medical images, weather images, etc. Next, training data sets (b) and (c) may be prepared at operation 510. Sets (b) and (c) may be obtained by changing the colors in set (a) to various colors corresponding to how a color vision deficient person would see the image.

At operation 515, AI model A may be initialized for training with respect to people having normal color vision and networks B and C may be initialized for training with respect to people having different types and/or degrees of deficient color vision (e.g., deuteranopia, tritanopia, etc.) The AI models A, B, and C may enter loop 520-535. At operation 520, an image from training set (a) may be provided to AI model A, which may make a prediction of the objects therein. At operations 525 and 530, images from training set (b) and training set (c) may be given to AI models B and C, respectively, which will also make predictions of the objects therein. At operation 535, the predictions from the three AI models A, B, and C may be compared to their respective training images (e.g., percentage correct, weighted percentage correct, etc.), and a gradient may be computed. If the gradient is greater than a predetermined threshold (operation 537), then the loop 520-535 may be repeated. If the gradient is less than a predetermined threshold, the loop 520-535 may end. The resulting trained AI models A, B, and C may be returned at operation 545.

Figure 6:
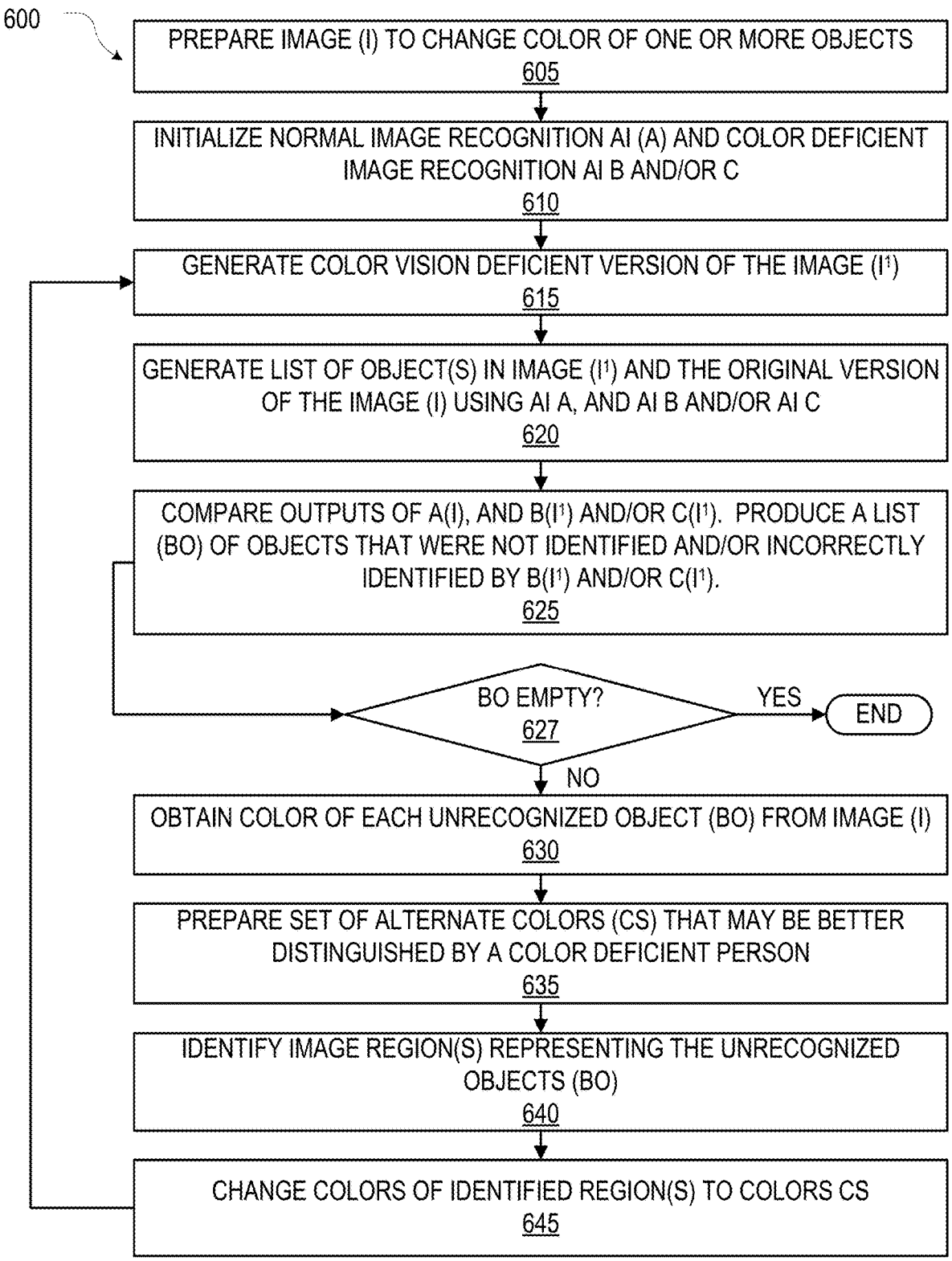
FIG. 6 is a flow chart illustrating one method for processing a color-change using a normal AI model and color vision deficient AI model during an operational phase, consistent with some embodiments.

FIG. 6 is a flow chart illustrating one method 600 for processing a color-change using a normal AI model and a color vision deficient AI model during an operational phase, consistent with some embodiments. At operation 605, an image (i) in which a user wants to change color of one or more objects may be identified and provided. Next, normal image recognition AI model A and color deficient image recognition AI models B and C may be loaded operation 610 to recognize objects in provided images.

Next, loop 615-645 may be entered. At operation 615, a color vision deficient version of the image (0) may be generated by changing the colors corresponding to a color vision deficient person type B and/or type C, e.g., using the operations of 510. The new version of the image (0) and the original version of the image (i) may then be processed by AI model A, and by AI models B and/or C, to recognize any object(s) therein at operation 620, generating a list of identified objects A(i), and B($i^1$) and/or C($i^1$). The outputs of the AI models i.e., A(i), and B($i^1$) and/or C($i^1$), may be compared at operation 625, producing a list (BO) of objects that were not identified and/or incorrectly identified in B($i^1$) and/or C($i^1$).

If no objects were not identified and/or incorrectly identified (operation 627), then the loop may end and the current version of the image ($i^1$) may be returned. If, however, any objects were not identified and/or incorrectly identified, then at operation 630, the color of each unrecognized object (BO) may be obtained from image (i). A set of alternate colors (CS) may be prepared at operation 635 that may be better distinguished by a color deficient person. The image region(s) representing the unrecognized objects (BO) may be obtained at operation 640. The colors of those region(s) may be changed to colors CS at operation 645. Some embodiments may optionally utilize a recognition metric (e.g., user survey score or test) by which an amount of improvement may be measured.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a subsystem, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

GENERAL

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for generating an image with improved accessibility for color vision diversity, the method comprising:
    obtaining, as a first output, a first set of objects included in a first image by inputting the first image to a first AI model;
    obtaining, as a second output, a second set of objects included in a second image by inputting the second image to a second AI model, wherein the second image is generated by changing at least one color from the first image;
    comparing the first set of objects and the second set of objects to extract an object that is included in the first set of objects but not included in the second set of objects as an unrecognized object based on the color of the unrecognized object; and
    replacing a color of the unrecognized object in the first image with a color easily recognized by a person having color vision deficiency.

2. The method of claim 1, further comprising generating, by a third AI model, from the first image targeted to improve accessibility, the second image having colors as viewed by the person having color vision deficiency.

3. The method of claim 1, wherein a plurality of the second AI models are prepared, wherein each second AI model of the plurality of the second AI models corresponding to a different color vision characteristic.

4. The method of claim 1, further comprising, in an AI model learning phase:
    generating, from a first learning data set of normal images, a second learning data set of images with colors looked at by the person having color vision deficiency; and
    training a first AI model by the first learning data set to recognize images and training a second AI model by the second learning data set to recognize images.

5. The method of claim 4, wherein the first learning data set of normal images comprises domain-specific images.

6. The method of claim 1, further comprising selectively replacing the first image with the second image in a computer graphics display.

7. The method of claim 6, wherein the replacing improves a recognition metric in the computer graphics display by people with color vision deficiency.

8. The method of claim 7, wherein the computer graphics display comprises a graphical user interface.

9. The method of claim 7, wherein the computer graphics display comprises a presentation slide.

10. A computer program product for generating an image with improved accessibility for color vision diversity, the computer program product comprising a computer readable storage medium having program instructions embodied therewith, the program instructions executable by a computer to perform a method comprising:
    obtaining, as a first output, a first set of objects included in a first image by inputting the first image to a first AI model;
    obtaining, as a second output, a second set of objects included in a second image by inputting the second image to a second AI model, wherein the second image is generated by changing at least one color from the first image;
    comparing the first set of objects and the second set of objects to extract an object that is included in the first set of objects but not included in the second set of objects as an unrecognized object based on the color of the unrecognized object; and
    replacing a color of the unrecognized object in the first image with a color easily recognized by a person having color vision deficiency.

11. The computer program product of claim 10, wherein the method further comprises, in an AI model learning phase:
    generating, from a first learning data set of normal images, a second learning data set of images with colors looked at by the person having color vision deficiency; and
    training a first AI model by the first learning data set to recognize images and training a second AI model by the second learning data set to recognize images.

12. A system for generating an image with improved accessibility for color vision diversity, the system comprising:
    one or more processors; and
    a memory communicatively coupled to the one or more processors;
    wherein the memory comprises instructions which, when executed by the one or more processors, cause the one or more processors to perform a method comprising:
        obtaining, as a first output, a first set of objects included in a first image by inputting the first image to a first AI model;
        obtaining, as a second output, a second set of objects included in a second image by inputting the second image to a second AI model, wherein the second image is generated by changing at least one color from the first image;
        comparing the first set of objects and the second set of objects to extract an object that is included in the first set of objects but not included in the second set of objects as an unrecognized object based on the color of the unrecognized object; and
        replacing a color of the unrecognized object in the first image with a color easily recognized by a person having color vision deficiency.

13. The system of claim 12, wherein the method further comprises generating, by a third AI model, from the first image targeted to improve accessibility, the second image having colors as viewed by the person having color vision deficiency.

14. The system of claim 12, wherein a plurality of the second AI models are prepared, wherein each second AI model of the plurality of the second AI models corresponding to a different color vision characteristic.

15. The system of claim 12, wherein the method further comprises, in an AI model learning phase:
    generating, from a first learning data set of normal images, a second learning data set of images with colors looked at by the person having color vision deficiency; and
    training a first AI model by the first learning data set to recognize images and training a second AI model by the second learning data set to recognize images.

16. The system of claim 15, wherein the first learning data set of normal images comprises domain-specific images.

17. The system of claim 12, wherein the method further comprises selectively replacing the first image with the second image in a computer graphics display.

18. The system of claim 17, wherein the replacing improves a recognition metric in the computer graphics display by people with color vision deficiency.

19. The system of claim 18, wherein the computer graphics display comprises a graphical user interface.

20. The system of claim 18, wherein the computer graphics display comprises a presentation slide.

* * * * *